US008837805B1

(12) United States Patent
Aviyants

(10) Patent No.: US 8,837,805 B1
(45) Date of Patent: Sep. 16, 2014

(54) SYSTEM AND METHOD FOR VERIFICATION OF A BANKNOTE

(71) Applicant: Rafael Aviyants, Manchester, NH (US)

(72) Inventor: Rafael Aviyants, Manchester, NH (US)

( * ) Notice: Subject to any disclaimer, the term of this patent is extended or adjusted under 35 U.S.C. 154(b) by 0 days.

(21) Appl. No.: 14/204,052

(22) Filed: Mar. 11, 2014

(51) Int. Cl.
*G06K 9/00* (2006.01)
*G07D 7/20* (2006.01)

(52) U.S. Cl.
CPC .......... *G07D 7/2033* (2013.01); *G06K 9/00463* (2013.01)
USPC .......................................................... 382/135

(58) Field of Classification Search
USPC .......................................................... 382/135
See application file for complete search history.

(56) References Cited

U.S. PATENT DOCUMENTS 5,739,765 A * 4/1998 Stanfield et al. ............... 340/8.1
7,124,934 B2 * 10/2006 Graham ........................ 235/379
7,602,956 B2 * 10/2009 Jones et al. .................... 382/135
7,724,938 B2 * 5/2010 Pareskevakos ................ 382/135
7,903,863 B2 3/2011 Jones et al.
8,204,293 B2 6/2012 Csulits et al.
8,396,278 B2 * 3/2013 Jones et al. ................... 382/135
8,655,045 B2 * 2/2014 Jones et al. ................... 382/135
2003/0059098 A1 3/2003 Jones et al.
2003/0132281 A1 7/2003 Jones et al.
2005/0265591 A1 12/2005 Jones et al.
2005/0278239 A1 12/2005 Jones et al.
2006/0010071 A1 1/2006 Jones et al.
2009/0231615 A1 * 9/2009 Itami ............................ 358/1.15
2009/0313159 A1 12/2009 Jones et al.
2011/0258113 A1 10/2011 Jones et al.
2012/0150745 A1 * 6/2012 Csulits et al. ................... 705/45
2013/0148874 A1 6/2013 Jones et al.

* cited by examiner

*Primary Examiner* — Michelle Enterzari
(74) *Attorney, Agent, or Firm* — Hayes Soloway P.C.

(57) ABSTRACT

A system and method for verification of a banknote is provided. The system includes a checking device having an optical reader. A computing device is in communication with the checking device, wherein a record of a serial number of a banknote optically read by the optical reader is transmitted to the computing device. A database housed on a memory of the computing device has a plurality of stored serial numbers. A processor of the computing device compares the record of the serial number of the banknote with the plurality of stored serial numbers within the database and determines a result of the comparison of the serial number of the banknote with the plurality of stored serial numbers. A result indicator is communicated from the processor to the checking device to indicate a result of the comparison of the serial number of the banknote with the plurality of stored serial numbers.

16 Claims, 10 Drawing Sheets

| | |
|---|---|
| "Check In" – banknote check in checking process. | "Check Out" – banknote check out checking process. |
| MFPD/Checking Device. | Computer System |

FIG. 11

SYSTEM AND METHOD FOR VERIFICATION OF A BANKNOTE

FIELD OF THE DISCLOSURE

The present disclosure is generally related to currency authentication and more particularly is related to a system and method for verification of a banknote.

BACKGROUND OF THE DISCLOSURE

A significant number of crimes committed in today's age are related to money, and in particular cash money. For example, theft and robbery of cash at stores, banks, and other institutions that carry large amounts of cash is a common occurrence. Criminal enterprises often conduct their financial transactions using cash bills. The reasons for this are well known to law enforcement agencies. The most important reason is that cash transactions are exceedingly difficult for law enforcement agencies to track and trace. This gives the criminal enterprise some level of freedom to conduct the financial side of their "business" without fear of governmental inspection. A need accordingly exists to better assist law enforcement in monitoring individual, business and enterprise use of currency bills in a manner that allows for the tracking and tracing of currency flowing into and out of the accounts of criminal suspects.

While some techniques have been implemented to prevent the use of cash gained illegally, they are difficult to implement on a wide scale. For example, dye packs are used with cash stored in banks to dye stolen cash when it is stolen. However, it is impractical to use dye packs within point of purchase situation, such as within malls, grocery stores, and other stores. If the criminals that illegally take the cash could not use the cash at other stores—or if it became significantly harder for them to use the stolen cash at other stores—the motivation to commit theft or robbery of cash would decrease.

Thus, a heretofore unaddressed need exists in the industry to address the aforementioned deficiencies and inadequacies.

SUMMARY OF THE DISCLOSURE

Idea of invention: CCM (Currency Control Method), it is a special method/process of banknote control, which one includes step/parts: "Check In", "Check Out", that two stages works with MFPD (Multi-Functional Process Device) and Computer Systems.

Embodiments of the present disclosure provide a system and method for verification of a banknote. Briefly described, in architecture, one embodiment of the system, among others, can be implemented as follows. The system includes a checking device having an optical reader. A computing device is in communication with the checking device, wherein a record of a serial number of a banknote optically read by the optical reader is transmitted to the computing device. A database has a plurality of stored serial numbers, wherein the database is housed on a memory of the computing device. A processor of the computing device compares the record of the serial number of the banknote with the plurality of stored serial numbers within the database and determines a result of the comparison of the serial number of the banknote with the plurality of stored serial numbers. A result indicator is communicated from the processor to the checking device, wherein the result indicator indicates a result of the comparison of the serial number of the banknote with the plurality of stored serial numbers.

The present disclosure can also be viewed as providing a method for verifying a banknote at a point of purchase. In this regard, one embodiment of such a method, among others, can be broadly summarized by the following steps: receiving a banknote from a purchaser; optically reading a serial number of the banknote with a checking device; transmitting a record of the serial number of the banknote to a computing device; using a processor of the computing device, comparing the serial number of the banknote to a plurality of invalid serial numbers stored within a memory in communication with the computing device, wherein the plurality of invalid serial numbers correspond to a plurality of invalid banknotes; transmitting a result of the comparison of the serial number of the banknote with the plurality of invalid serial numbers to the checking device; and indicating, at the checking device, the result of the comparison of the serial number of the banknote with the plurality of invalid serial numbers to the checking device.

The present disclosure can also be viewed as providing a method for verifying a banknote at a point of purchase. In this regard, one embodiment of such a method, among others, can be broadly summarized by the following steps: receiving a first banknote from a purchaser; checking-in a first banknote, wherein checking-in the first banknote comprises: optically reading a serial number of the first banknote with a checking device; transmitting a record of the serial number of the first banknote to a computing device; using a processor of the computing device, comparing the serial number of the first banknote to a plurality of invalid serial numbers stored within a memory in communication with the computing device, wherein the plurality of invalid serial numbers correspond to a plurality of invalid banknotes; transmitting a result of the comparison of the serial number of the first banknote with the plurality of invalid serial numbers to the checking device; and indicating, at the checking device, the result of the comparison of the serial number of the first banknote with the plurality of invalid serial numbers to the checking device; checking-out a second banknote, wherein checking-out the second banknote comprises: optically reading a serial number of the second banknote with the checking device; transmitting a record of the serial number of the second banknote to the computing device; and using the processor of the computing device, removing the serial number of the second banknote from a database of valid serial numbers stored within the memory in communication with the computing device, wherein the plurality of valid serial numbers correspond to a plurality of valid banknotes; and giving the second banknote to the purchaser.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 11 illustrates the main parts of the CCM for proper functionality of the method, in accordance with a fifth exemplary embodiment of the disclosure.

DETAILED DESCRIPTION

Figure 1:
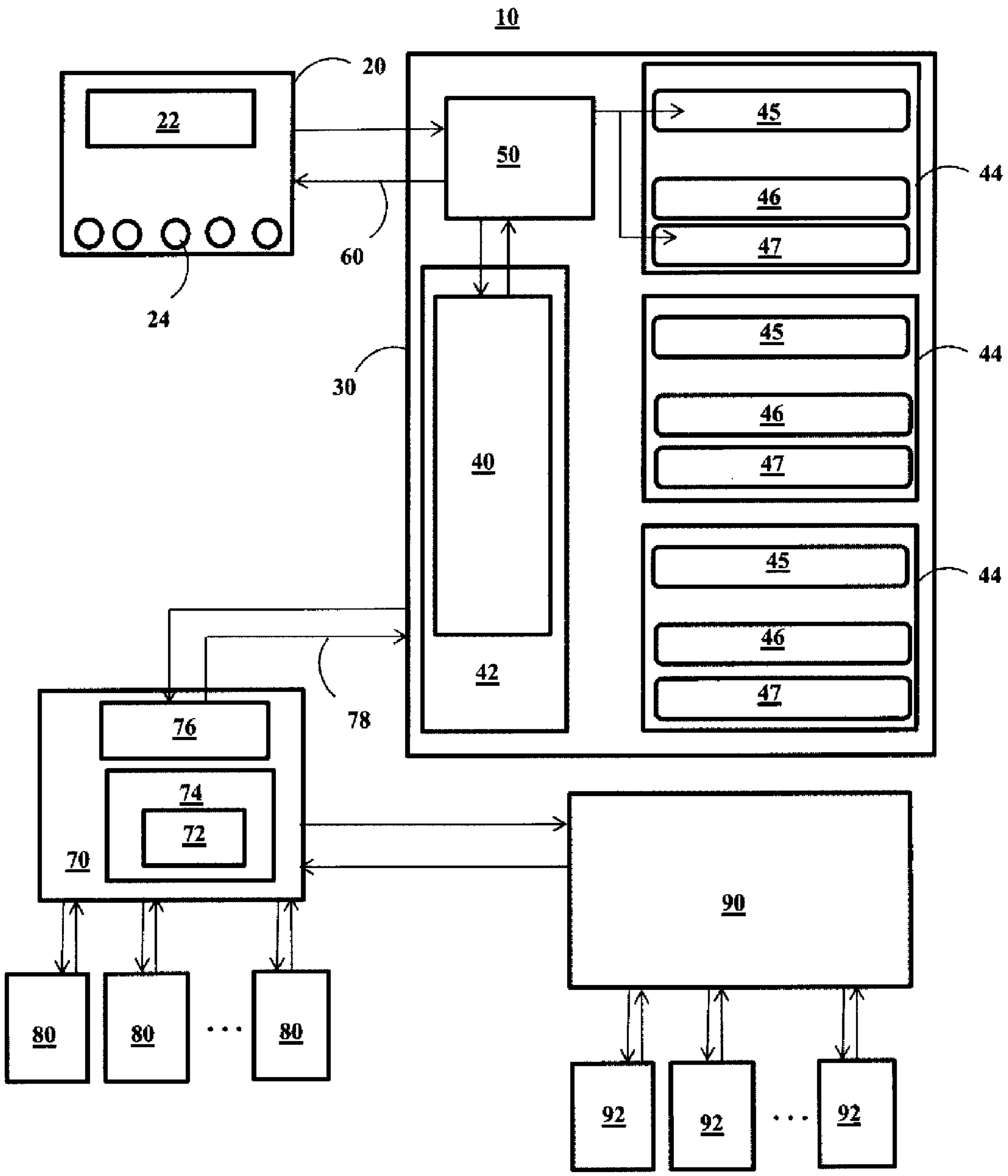
FIG. 1 is a schematic illustration of a system for verification of a banknote, in accordance with a first exemplary embodiment of the present disclosure.

FIG. 1 is a schematic illustration of a system 10 for verification of a banknote, in accordance with a first exemplary embodiment of the present disclosure. The system 10 for verification of a banknote, which may be referred to herein simply as 'system 10' includes a checking device 20 having an optical reader 22. A computing device 30 is in communication with the checking device 20, wherein a record of a serial number of a banknote optically read by the optical reader 22 is transmitted to the computing device 30. A database 40 has a plurality of stored serial numbers, wherein the database 40 is housed on a memory 42 of the computing device 30. A processor 50 of the computing device compares the record of the serial number of the banknote with the plurality of stored serial numbers within the database 40 and determines a result of the comparison of the serial number of the banknote with the plurality of stored serial numbers. A result indicator communicated (indicated by arrow 60) from the processor 50 to the checking device 20, wherein the result indicator indicates a result of the comparison of the serial number of the banknote with the plurality of stored serial numbers. The system 10 is used for verification of banknotes and other monetary notes having identifying characteristics. A banknote, often referred to as a bill, paper money, or note, is a physical note having a monetary value. The banknote may have many identifying characteristics on it, including a denomination, a currency country identifier, images, and a serial number. A banknote from any country or jurisdiction may be used with the system 10. Banknotes are used around the globe to purchase goods and services and points of purchase, such as at check-out registers with cashiers. The system 10 may implemented as a currency control method (CCM), wherein the use of physical currency, commonly paper banknotes, in commercial transactions are controlled by verification of the legitimacy of the banknote in real-time or near real-time. In some situations, the system 10 can be used to verify other monetary instruments, such as stocks, bonds, shares, government securities, and other securities.

Accordingly, the system 10 may operate with a two-part functionality including a 'check-in' part and a 'check-out' part. The check-in aspect of the system 10 allows a user of the system 10 receive a banknote and verify its validity using the system 10, whereas the check-out aspect of the system 10 allows a user to record in the system 10 when a banknote is returned to a customer, such as when giving a customer change for his or her purchase. Under the operation of the check-in and check-out method, the system 10 may be capable of successfully verifying whether a banknote is invalid or valid. The terms 'check-in' and 'check-out' may also be replaced with the terms 'sign-in', 'sign-out', and 'log-in' and 'log-out', among others.

The checking device 20, which may be referred to as a multi-functional process device (MFPD), may be positioned proximate to the point of purchases, such as on a check-out register, on a counter near a register, or incorporated within a cash register. The checking device 20 may be a standalone device or a device that is combined with or contained in another device, such as a computer or cash register. The checking device 20 may also be a mobile device, such as a smartphone or PDA, which can be used at points of purchase without traditional cash registers. The checking device 20 may perform the steps of "checking-in" the banknote and "checking-out" a banknote, as will be described in further detail herein. The checking device 20 includes an optical reader 22 which is capable of identifying the serial number of the banknote optically and reading the serial number of the banknote to record the serial number. The optical reader 22 may use optical character recognition (OCR) or another form of optical reading, many of which are known in the art. It is noted that optically reading the serial number of the banknote is not equivalent to scanning the banknote to simply capture an image. Accordingly, while the optical reader 22 may scan the banknote or otherwise take a pictographic record of the banknote, the optical reader 22 reads and records the alphanumeric serial number of the banknote for transmission. The banknote may have one or more serial numbers that contain any combination of alphanumeric characters within the serial number, as may be dependent on the originating jurisdiction of the banknote.

Computing device 30 may be a computer, a plurality of computers with a processor and a non-transient memory, or any other type of stationary or mobile computing device. The computing device 30 may be a standalone device or it may be in communication with other systems via a network, such as an Internet connection. The computing device 30 may have a plurality of components commonly used with computers and computerized cash registers, including a database 40 stored within the memory 42 and a processor 50.

While the computing device 30 may include many data banks for storage of data, the database 40 may include a plurality of stored serial numbers from a plurality of banknotes. The stored serial numbers may commonly be invalid serial numbers, i.e., serial numbers that correspond to banknotes that have been determined to be invalid. In accordance with this disclosure, invalid banknotes may be characterized as banknotes which are currently illegitimate due to a variety of circumstances, such as if they were obtained unlawfully, if they are counterfeit, or if they have otherwise been identified as not fully acceptable for use in commerce. It is noted that the invalid banknote may have been valid previously or may have never been deemed valid before. For example, a banknote previously stolen would be classified as invalid after it was stolen, whereas a banknote that is counterfeit would never be valid, and thus always be invalid.

The checking device 20 may include a plurality of indicators 24, such as lights (as is shown in FIG. 1), speakers for producing an audible tone, or other devices for indicating a result of the comparison of the recorded serial number of the banknote to the plurality of stored serial numbers. The result indicator 60, identified by the arrow between the processor 50 and the checking device 20, may communicate the signal for activation of one of the plurality of indicators 24 on the checking device 20.

The computing device 30 may include a plurality of account folders 44, each having a variety of subfolders. There may be an account folder 44 for each user/cashier using the system 10 in a particular store. For example, a store with 10 checkout registers may have 10 account folders 44. Each account folder may have an identification number, including a company's personal ID number plus an extension. For example, a company's ID number may be 3762428 where an extension for cashier #1 has "1", thereby giving that specific cashier the ID of 3762428_1. Each of the account folders 44 may be in communication with the processor 50 and/or the database 40, directly or indirectly. The account folders 44 may include a check-in folder 45, a fail archive folder 46 and a temporary archive folder 47, among others. The check-in folder 45 may include a record of all banknotes checked-in to the system 10, the fail archive folder 46 may have a record of all banknotes that have been checked-in to the system 10 and have been matched with one of the plurality of stored serial numbers within the database 40, and the temporary archive folder 47 may contain banknote information and other information that is stored temporarily, such as in between periods of time when the computing device 30 is updated.

Implementation of the system 10 may include a number of optional configurations. For example, as is shown in FIG. 1, the system 10 may be in communication with a central computing system 70 via a network connection, such as an Internet or intranet connection. The central computing system 70 may be in communication with a plurality of remote computing devices 80, which may be substantially similar to the computing device 30 but located remotely from the computing device 30, e.g., located in other stores or others points of purchase. It is noted that each of the plurality of remote computing devices 80 may include any of the components and functions described relative to the computing device 30.

Similar to the computing device 30, the central computing system 70 may include a central database 72 having a second plurality of stored serial numbers, wherein the central database 72 is housed on a memory 74 of the central computing system 70. The second plurality of stored serial numbers may be the same or different from the first plurality of stored serial numbers. Commonly the second plurality of stored serial numbers in database 72 may be updated based on the computing device 30 and the remote computing devices 80 connected thereto to compile a complete record of stored serial numbers, wherein the database 40 of the computing device 30 and the databases of each of the remote computing devices 80 are then updated based in the database 72. In one example, the second plurality of stored serial numbers may be updated based on a third plurality of stored serial numbers provided by the plurality of remote computing devices 80. Thus, while it may be desirable for the system 10 to have the same stored serial numbers within the databases 40, 72, the updating process may create periods of time where the stored serial numbers differ. It is beneficial to have the update time as short as possible, such that there is as close to real-time updating as is possible. It is noted that updating of the serial number records between the computing devices 80 within a jurisdiction, such as a country, or around the world, may enable the system 10 to prevent a significant amount of illegal use of banknotes, since all places where the banknotes are used may require the banknotes to be checked-in and checked-out.

A processor 76 of the central computing system 70 may compare the record of the serial number of the banknote with a second plurality of stored serial numbers within the database 72 and determine a second result of the comparison of the serial number of the banknote with the second plurality of stored serial numbers. A result signal, indicated by arrow 78, may be communicated from the processor 76 of the central computing system to the processor 50 of the computing device 30, wherein the result signal indicates a result of the comparison of the serial number of the banknote with the second plurality of stored serial numbers. The system 10 may further include an international computing system 90 in communication with the central computing system 70 with a second network connection, wherein the international computing system 90 is in further communication with a third plurality of remote computing devices 92. The international computing system 90 may include the same components as the central computing system 70 and may operate substantially identical to the central computing system 70, but is intended to operation on an international level.

Figure 2:
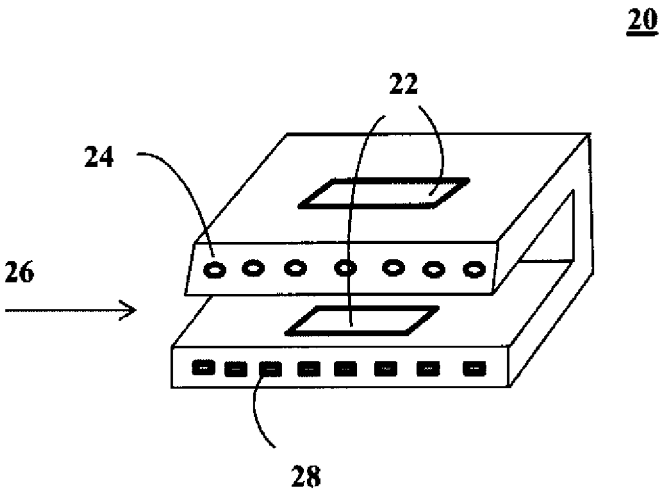
FIG. 2 is a plan view illustration of the checking device of FIG. 1, in accordance with the first exemplary embodiment of the present disclosure.

FIG. 2 is a plan view illustration of the checking device 20 of FIG. 1, in accordance with the first exemplary embodiment of the present disclosure. While the checking device 20 may include many different designs and configurations, it may be preferable for the checking device 20 to have a pathway 26 through which the banknote may be moved for optical reading of the serial number. In FIG. 2, the pathway 26 may be created between two parts of the checking device, such that the banknote is brought within a close proximity of the optical reader(s) 22. The checking device 20 may have a plurality of indicators 24 positioned on the front face of the checking device 20, or another readily visible face, such that a user of the checking device 20 can easily and quickly understand whether the banknote is invalid or valid. In one example, the indicators 24 may include a green light, such as an LED, which illuminates when a banknote has been found to be valid, a red light which illuminates when the banknote has been determined to be invalid, a yellow light that illuminates when the system is processing the serial number, and other lights that may indicate other operations, such as system malfunction, network connection, etc. The checking device 20 may also include a plurality of buttons 28 or other actuatable features that allow the user of the system 10 to turn the checking device 20 on/off, reset it, update it, etc. The checking device 20 may also include a memory board, power cable, network port, wireless antenna, and other components that enhance its functionality.

In use at a point of purchase, the system 10 may be implemented in any place where banknotes, namely cash, is used, such as a bank, a store, a taxi driver, etc. For example, a man may come into a store for shopping and takes all the items he desires to purchase to a check-out register when he is ready to pay for the products. He hands the cashier the cash to pay for his items. Before the cashier places the money within the cash register, the cashier guides them through the checking device 10 to initiate the 'check-in' process and waits for a result to be indicated. If a positive indication, e.g., a green light, comes on, the check-in process has determined that the cash is valid and thus can be accepted. And if a negative indication, e.g., a red light, conies one, the check-in process has determined that the bill is invalid and cannot be accepted. The cashier should refuse to accepted the particular bill and ask for other cash or another form of payment.

Figure 3:
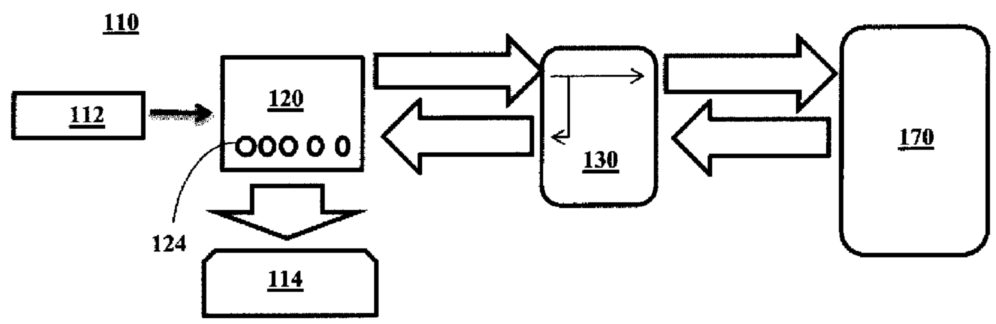
FIG. 3 is a schematic illustration of the operation of a system for verification of a banknote, in accordance with a second exemplary embodiment of the present disclosure. This figure describes the 'check in' stage.

FIG. 3 is a schematic illustration of the operation of a system 110 for verification of a banknote, in accordance with a second exemplary embodiment of the present disclosure. The system 110 for verification of a banknote, which may be referred to simply as 'system 110' may include any of the components and functions described relative to any embodiment of this disclosure. In particular, FIG. 3 illustrates the 'check-in' process for a banknote that is determined to be valid. As is shown in FIG. 3, a banknote 112, which may be received from a customer or purchaser of goods/services, is checked by a checking device 120. The checking device 120 optically reads the serial number of the banknote. A record of the serial number of the banknote is transmitted (upper arrow) to a computing device 130. A processor of the computing device 130 compares the serial number of the banknote to a plurality of invalid serial numbers stored within a memory that is within or in communication with the computing device 130. The plurality of invalid serial numbers correspond to a plurality of invalid banknotes.

A result of the comparison is obtained and it is determined that the serial number of the banknote does not match any of the plurality of invalid serial numbers within the database. Optionally, the recorded serial number of the banknote is transmitted to a central computing system 170 for a comparison process. A result of the comparison of the serial number of the banknote with the plurality of invalid serial numbers is transmitted (lower arrow) back to the checking device. An indicator 124 on the checking device 120 indicates the result of the comparison of the serial number of the banknote with the plurality of invalid serial numbers. Since the banknote is verified as being valid, the user of the system places the banknote 112 within a cash register. Concurrently, the computing device may save a record of the inventory of the banknote 112, such that it has a complete record of all banknotes within the cash register 114.

Figure 4:
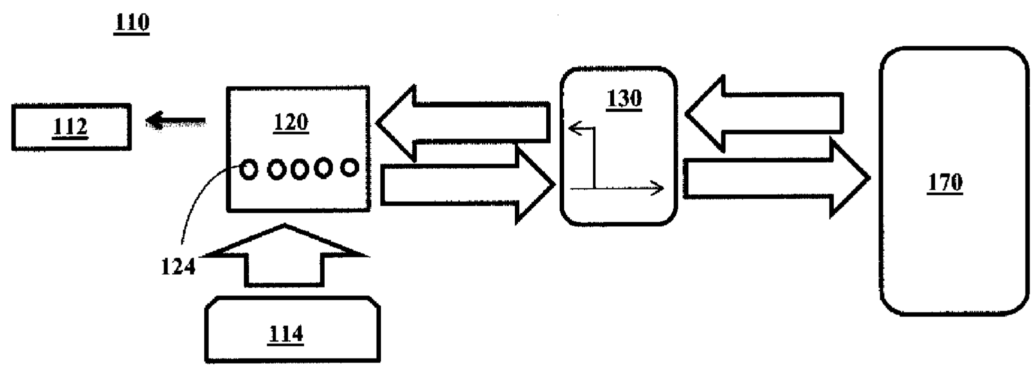
FIG. 4 is a schematic illustration of the operation of the system for verification of a banknote, in accordance with the second exemplary embodiment of the present disclosure. This figure describes the 'check out' stage.

FIG. 4 is a schematic illustration of the operation of the system 110 for verification of a banknote, in accordance with the second exemplary embodiment of the present disclosure. FIG. 4 illustrates the 'check-out' process for a banknote that is determined to be valid. When a banknote is needed to be returned to the purchaser, such as when receiving change for a large denomination banknote, the cashier moves the banknote 112 past the checking device 120 such that it can optically read the serial number on the banknote 112. The record of the serial number of the banknote 112 is transmitted to the computing device 130 where it is removed from the record of all banknotes within the cash register 114. The banknote 112 may also be checked with the plurality of invalid serial numbers within the database of the computing device 130 to determine if the banknote 112 has been classified as invalid since it was initially inserted into the cash register 114. A result of the removal of the serial number of the banknote 112 and the clearance with the comparison of the plurality of invalid serial numbers is transmitted back to the checking device 120 where an indicator light 124 illuminates to indicate a valid banknote. The cashier then gives the banknote 112 to the purchaser. Optionally, the recorded serial number of the banknote 112 is transmitted to a central computing system 170 for a comparison process.

Figure 5:
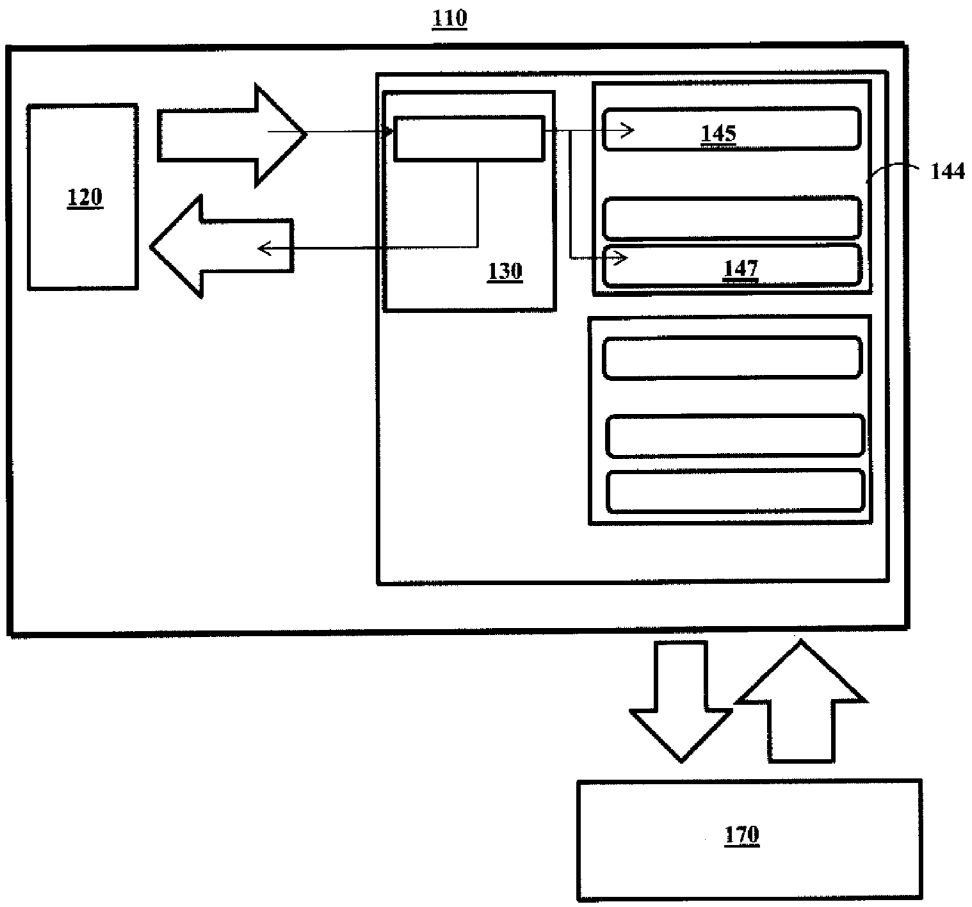
FIG. 5 is a schematic illustration of the operation of the system for verification of a banknote, in accordance with the second exemplary embodiment of the present disclosure.

FIG. 5 is a schematic illustration of the operation of the system 110 for verification of a banknote, in accordance with the second exemplary embodiment of the present disclosure. FIG. 5 depicts the process for checking-in a valid banknote in additional detail relative to FIG. 3. When the record of the serial number of the banknote is received in the computing device 130 from the checking device 120, a record of the serial number is recorded in the account folder 144. Specifically, the serial number is recorded in the check in folder 145 of the account folder and the temporary archive folder 147 of the account folder 144. The indication of the valid banknote may be cross checked with the central computing system 170 and the result is communicated back to the checking device 120.

Figure 6:
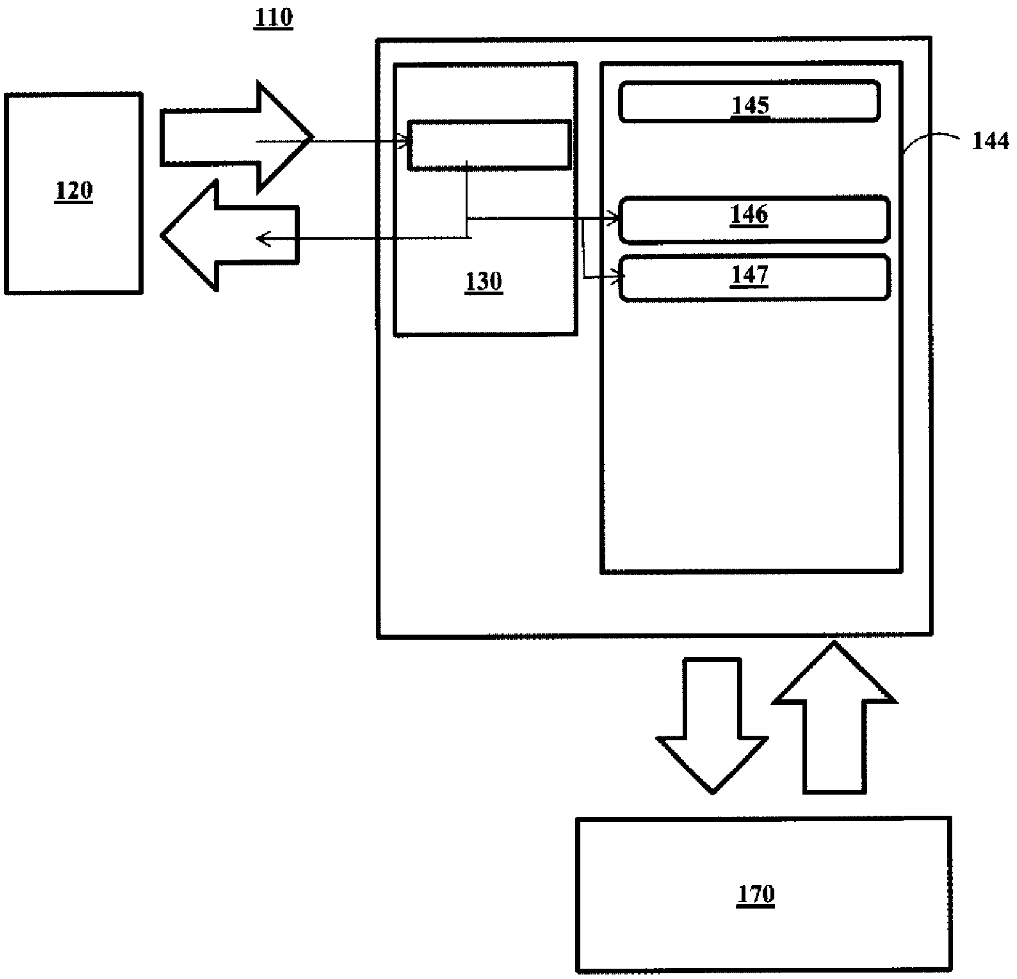
FIG. 6 is a schematic illustration of the operation of the system for verification of a banknote, in accordance with the second exemplary embodiment of the present disclosure.

FIG. 6 is a schematic illustration of the operation of the system 110 for verification of a banknote, in accordance with the second exemplary embodiment of the present disclosure. FIG. 6 depicts the process for checking-in a banknote which is invalid. When the record of the serial number of the banknote is compared to the plurality of invalid serial numbers within the database of the computing system, it is determined that there is a match. Accordingly, a match between the serial number of the banknote and the plurality of invalid serial numbers indicates that the banknote is invalid and should not be accepted. The record of the serial number of the banknote is recorded in the fail archive folder 146 and in the temporary archive folder 147 of the account folder 144. The indication of the invalid banknote may be cross checked with the central computing system 170 and the result is communicated back to the checking device 120.

Figure 7:
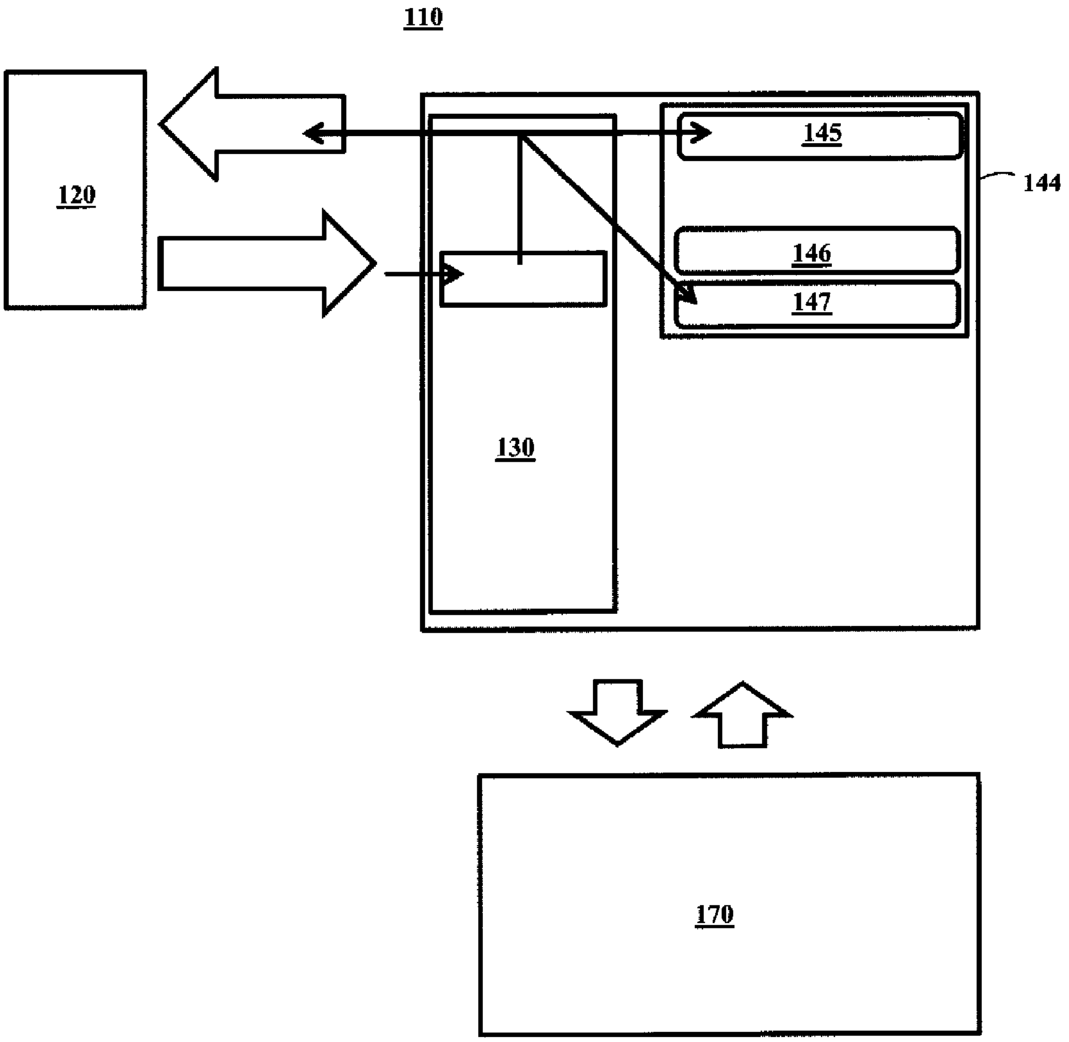
FIG. 7 is a schematic illustration of the operation of the system for verification of a banknote, in accordance with the second exemplary embodiment of the present disclosure.

FIG. 7 is a schematic illustration of the operation of the system 110 for verification of a banknote, in accordance with the second exemplary embodiment of the present disclosure. FIG. 7 depicts the process for checking-out a valid banknote in additional detail relative to FIG. 4. When the record of the serial number of the banknote is received in the computing device 130 from the checking device 120 when it was optically read, a record of the serial number is removed from the check in folder 145 of the account folder 144 and the temporary archive folder 147 of the account folder 144. The indication of the valid banknote may be compared to the plurality of invalid serial numbers in the database of the computing system 130 to ensure that the banknote is still valid. The indication of the valid banknote may also be cross checked with the central computing system 170 and the result is communicated back to the checking device 120 where the cashier gives the banknote to the purchaser.

Figure 8:
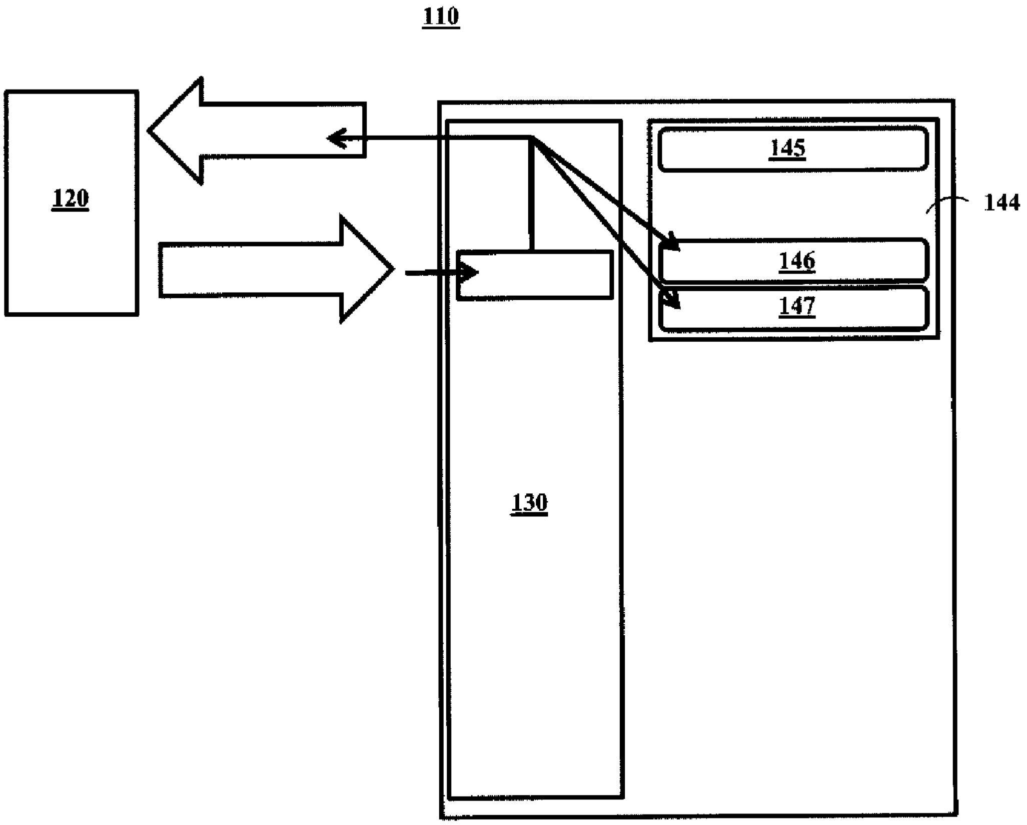
FIG. 8 is a schematic illustration of the operation of the system for verification of a banknote, in accordance with the second exemplary embodiment of the present disclosure.

FIG. 8 is a schematic illustration of the operation of the system 110 for verification of a banknote, in accordance with the second exemplary embodiment of the present disclosure. FIG. 8 depicts the process for checking-out a banknote which is invalid. For example, this process may be used when a banknote has been checked-in as valid but was later determined to be invalid. When the record of the serial number of the banknote is compared to the plurality of invalid serial numbers within the database of the computing system 130, it is determined that there is a match. Accordingly, a match between the serial number of the banknote and the plurality of invalid serial numbers indicates that the banknote is invalid and should not be used in circulation or given to a purchaser. The record of the serial number of the banknote is recorded in the fail archive folder 146 and in the temporary archive folder 147 of the account folder 144. The indication of the invalid banknote may be cross checked or updated with the central computing system and the result is communicated back to the checking device 120. The banknote may be removed from the cash register and reported to an appropriate authority.

With reference to the process using the system 110 described in FIGS. 3-8, the system 110 may include additional processes. For example, if a cash register is robbed and banknotes within the cash register that have previously been checked-in are stolen, the system 110 may be updated to reflect that the stolen banknotes are now considered invalid. The user of the system 110 can compares any remaining banknotes within the cash register with the record of the banknote serial numbers recorded in the check-in folder 145 of the account folder 144 to determine which of the banknotes were in fact stolen. These banknotes may then be designated as invalid and their serial numbers recorded in the fail archive folder 146. Other computing devices at other stores that utilize the system 110 may be updated with this information, thereby preventing the stolen banknotes from being used at those other stores. If the offender who stole the banknotes tries to use that money in any store that uses the system 110, an invalid indication, e.g., a red light, will show the cashier at that store that the money is invalid and should not be accepted.

The system 110 may record or capture other data relative to check-in or check-out process. For example, the system 110 may record the time that a banknote is checked-in, what store/cash register/terminal facilitated the transaction, and which banknotes with which cash together (e.g., if the banknote was stolen with other banknotes at the same time), among others. For a check-out, the system 110 may record the time that a banknote is checked-out, what store/cash register/terminal facilitated the transaction, and which banknotes were checked-out together, and whether the banknote was checked-out legally or if it was stolen, among others.

While the system 110 is described primarily for use in points of purchase, such as where a purchaser purchases goods or services, the system 110 may also be implemented in settings where banknotes are transferred without purchases, such in banks or other financial institutions. Furthermore, the system 110 may be implemented within automated machines that receive and/or dispense money, such as ATMs, self-checkout machines, machines that give change for large denomination banknotes, etc.

Figure 9:
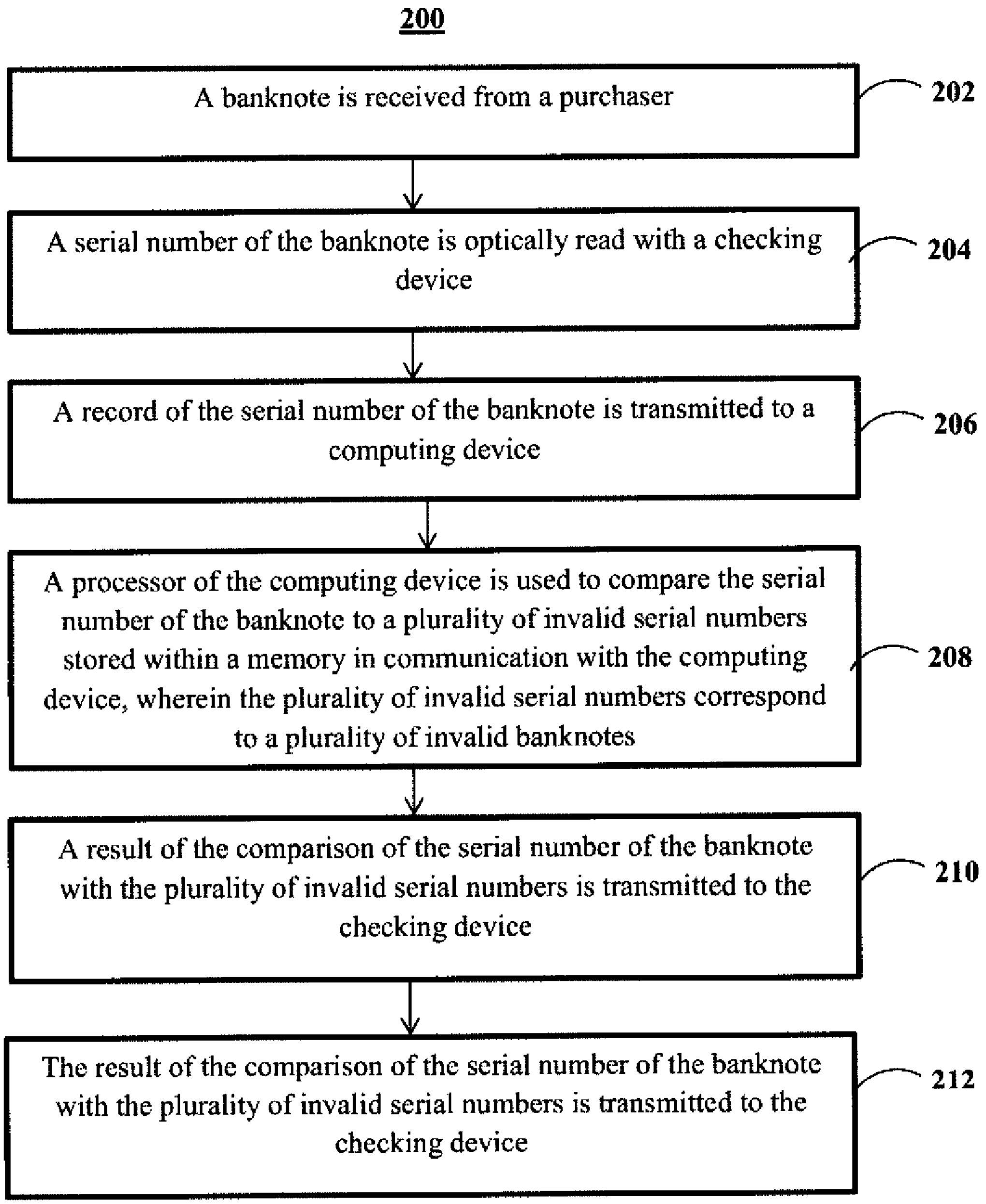
FIG. 9 is a flowchart illustrating a method for verifying a banknote at a point of purchase, in accordance with a third exemplary embodiment of the disclosure.

FIG. 9 is a flowchart 200 illustrating a method for verifying a banknote at a point of purchase, in accordance with a third exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a banknote is received from a purchaser. A serial number of the banknote is optically read with a checking device (block 204). A record of the serial number of the banknote is transmitted to a computing device (block 206). A processor of the computing device is used to compare the serial number of the banknote to a plurality of invalid serial numbers stored within a memory in communication with the computing device, wherein the plurality of invalid serial numbers correspond to a plurality of invalid banknotes (block 208). A result of the comparison of the serial number of the banknote with the plurality of invalid serial numbers is transmitted to the checking device (block 210). The result of the comparison of the serial number of the banknote with the plurality of invalid serial numbers is transmitted to the checking device (block 212).

Figure 10:
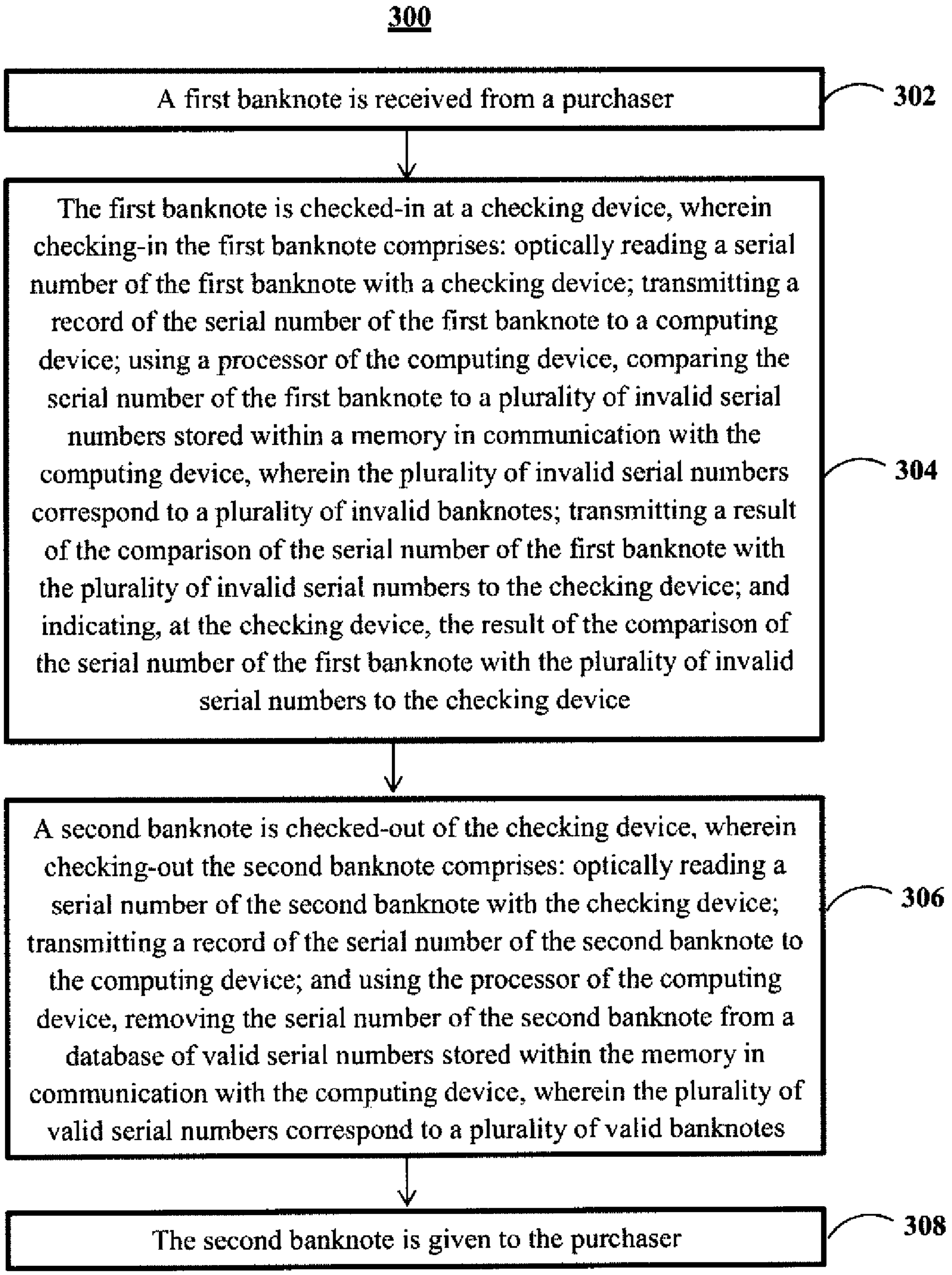
FIG. 10 is a flowchart illustrating a method for verifying a banknote at a point of purchase, in accordance with a fourth exemplary embodiment of the disclosure.

FIG. 10 is a flowchart 300 illustrating a method for verifying a banknote at a point of purchase, in accordance with a fourth exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 302, a first banknote is received from a purchaser. The first banknote is checked-in at a checking device, wherein checking-in the first banknote comprises: optically reading a serial number of the first banknote with a checking device; transmitting a record of the serial number of the first banknote to a computing device; using a processor of the computing device, comparing the serial number of the first banknote to a plurality of invalid serial numbers stored within a memory in communication with the computing device, wherein the plurality of invalid serial numbers correspond to a plurality of invalid banknotes; transmitting a result of the comparison of the serial number of the first banknote with the plurality of invalid serial numbers to the checking device; and indicating, at the checking device, the result of the comparison of the serial number of the first banknote with the plurality of invalid serial numbers to the checking device (block 304). A second banknote is checked-out of the checking device, wherein checking-out the second banknote comprises: optically reading a serial number of the second banknote with the checking device; transmitting a record of the serial number of the second banknote to the computing device; and using the processor of the computing device, removing the serial number of the second banknote from a database of valid serial numbers stored within the memory in communication with the computing device, wherein the plurality of valid serial numbers correspond to a plurality of valid banknotes (block 306). The second banknote is given to the purchaser (block 308).

FIG. 11 illustrates the main parts of the CCM for proper functionality of the method, in accordance with a fifth exemplary embodiment of the disclosure. As is shown in FIG. 11, the main parts of the CCM needed for proper method functionality include ‘check in’, ‘check out’, MFPD/checking device, and the computer system.

It should be emphasized that the above-described embodiments of the present disclosure, particularly, any “preferred” embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for verification of a banknote at a point of purchase, the system comprising:

a banknote received from a purchase, the banknote having an unknown legitimacy status;

a checking device having an optical reader;

a computing device in communication with the checking device, wherein a record of a serial number of a banknote optically read by the optical reader is transmitted to the computing device, wherein the record of the serial number of the banknote is stored within an account folder on a memory of the computing device;

a fail archive folder having a plurality of stored invalid serial numbers corresponding to a plurality of invalid banknotes, wherein the fail archive folder is within the memory of the computing device; and a processor of the computing device, wherein during a check-in process, the processor:

compares the serial number of the banknote having the unknown legitimacy status to the plurality of stored invalid serial numbers within the fail archive folder;

transmits a result of the comparison of the comparison of the serial number of the banknote with the plurality of stored invalid serial numbers to the checking device; and indicates, at the checking device, the result of the comparison of the serial number of the banknote with the plurality of stored invalid serial numbers, wherein the unknown legitimacy status of the banknote is updated to a valid, checked-in status in response to a negative result of the comparison of the banknote with the plurality of stored invalid serial numbers, wherein the record of the serial number is transferred into a check-in folder within the memory of the computing device, wherein the check-in folder is a subset of the account folder having a plurality of valid serial numbers corresponding to a plurality of valid banknotes;

and wherein, during a check-out process of a monetary transaction, the serial number of the banknote is optically read with the checking device, and a record of the serial number of the banknote is transmitted to the computing device, wherein the processor:

re-compares the serial number of the banknote having the valid, checked-in status to the plurality of stored invalid serial numbers stored within the fail archive folder to receive a verification of continued banknote validity since the check-in process of the banknote; and removes the serial number of the banknote from the check-in folder.

2. The system of claim 1, further comprising a second banknote, wherein the second banknote is checked-out, wherein a record of a serial number of the second banknote is optically read by the optical reader is transmitted to the computing device, wherein the processor first compares the serial number of the second banknote to the plurality of stored invalid serial numbers stored within the fail archive folder to verify continued banknote validity of the second banknote since a checking-in of the second banknote, and upon verification of continued validity, removes the serial number of the second banknote from the check-in folder.

3. The system of claim 1, further comprising a central computing system in communication with the computing device with a network connection, wherein the central computing system is in further communication with a plurality of remote computing devices.

4. The system of claim 3, wherein the record of a serial number of the banknote optically read by the optical reader is transmitted to the central computing system, wherein the central computing system further comprises:

a central database having a second plurality of stored serial numbers, wherein the central database is housed on a memory of the central computing system;

a processor of the central computing system, wherein the processor compares the record of the serial number of the banknote with the second plurality of stored serial numbers within the database and determines a second result of the comparison of the serial number of the banknote with the second plurality of stored serial numbers; and a result signal communicated from the processor of the central computing system to the processor of the computing device, wherein the result signal indicates a result of the comparison of the serial number of the banknote with the second plurality of stored serial numbers.

5. The system of claim 3, wherein the second plurality of stored serial numbers is updated based on a third plurality of stored serial numbers provided by the plurality of remote computing devices.

6. The system of claim 3, further comprising an international computing system in communication with the central computing system with a second network connection, wherein the international computing system is in further communication with a third plurality of remote computing devices.

7. The system of claim 1, wherein the account folder further comprises:

a temporary archive folder, wherein the account folder corresponds to an identification number of an employee.

8. A method for verifying a banknote at a point of purchase, the method comprising the steps of:

receiving a banknote having an unknown legitimacy status from a purchaser;

checking-in the banknote to verify a legitimacy of the banknote, wherein checking-in the banknote comprises:

optically reading a serial number of the banknote with a checking device;

transmitting a record of the serial number of the banknote to a computing device;

recording the record of the serial number within an account folder within a memory of the computing device;

using a processor of the computing device, comparing the serial number of the banknote to a plurality of invalid serial numbers stored within a fail archive folder within the memory of the computing device, wherein the plurality of invalid serial numbers correspond to a plurality of invalid banknotes;

transmitting a result of the comparison of the serial number of the banknote with the plurality of invalid serial numbers to the checking device; and indicating, at the checking device, the result of the comparison of the serial number of the banknote with the plurality of invalid serial numbers to the checking device;

updating the unknown legitimacy status of the banknote to a valid, checked-in status in response to a negative result of the comparison of the banknote with the plurality of invalid serial numbers, whereby the record of the serial number is transferred into a check-in folder within the memory of the computing device, wherein the check-in folder is a subset of the account folder having a plurality of valid serial numbers corresponding to a plurality of valid banknotes;

within a monetary transaction, checking-out the banknote, wherein checking-out the banknote comprises:

optically reading the serial number of the banknote with the checking device;

transmitting a record of the serial number of the banknote to the computing device;

using the processor of the computing device, re-comparing the serial number of the banknote having the valid, checked-in status to the plurality of invalid serial numbers stored within the fail archive folder to receive a verification of continued banknote validity since checking-in of the banknote; and using the processor of the computing device, removing the serial number of the banknote from the check-in folder; and giving the banknote to the purchaser.

9. The method of claim 8, wherein the result of the comparison of the serial number of the banknote with the plurality of invalid serial numbers is not a match, wherein the indication at the checking device is that the banknote is valid.

10. The method of claim 9, wherein the checking device optically reads a denomination of the banknote.

11. The method of claim 9, further comprising the step of updating the second plurality of invalid serial numbers stored in the memory in communication with the central computing system based on a third plurality of invalid serial numbers provided by the plurality of remote computing devices.

12. The method of claim 8, further comprising the steps of:

transmitting the record of the serial number of the banknote to a central computing system, the central computing system in communication with the computing device with a network connection, wherein the central computing system is in further communication with a plurality of remote computing devices;

using a processor of the central computing system, comparing the serial number of the banknote to a second plurality of invalid serial numbers stored within a memory in communication with the central computing system, wherein the second plurality of invalid serial numbers correspond to a second plurality of invalid banknotes; and transmitting a second result of the comparison of the serial number of the banknote with the second plurality of invalid serial numbers to the computing device.

13. The method of claim 8, wherein the result of the comparison of the serial number of the banknote with the plurality of invalid serial numbers is a match, wherein the indication at the checking device is that the banknote is invalid.

14. The method of claim 13, wherein the checking device is mobile.

15. The method of claim 13, further comprising the step of storing the result of the comparison of the serial number of the banknote with the plurality of invalid serial numbers within an account folder within the memory of the computing device, wherein the account folder further comprises a temporary archive folder, wherein the account folder corresponds to an identification number of an employee receiving the first banknote from the purchaser.

16. The method of claim 8, wherein checking-out the banknote further comprises the step of recording a check-out record of the banknote within the memory, wherein the check-out record includes at least one of: a time of check-out of the banknote; a cash register of check-out of the banknote; and a record of serial numbers of all other banknotes checked-out with the banknote.

* * * * *